US012743096B2

(12) United States Patent
Rubovitch et al.

(10) Patent No.: US 12,743,096 B2
(45) Date of Patent: Sep. 22, 2026

(54) AUTONOMOUS MOBILE ROBOT WITH SAFETY DEPTH CAMERA

(71) Applicant: REALSENSE, INC., Santa Clara, CA (US)

(72) Inventors: Ben Rubovitch, Haifa (IL); Gal Goren, Haifa (IL); Efraim Vitzrabin, Kiryat Uno (IL); Dan Horovitz, Rishon Lezion (IL); Mark Vaynberg, Haifa (IL)

(73) Assignee: REALSENSE, INC.

( * ) Notice: Subject to any disclaimer, the term of this patent is extended or adjusted under 35 U.S.C. 154(b) by 242 days.

(21) Appl. No.: 18/399,985

(22) Filed: Dec. 29, 2023

(65) Prior Publication Data

US 2025/0216853 A1 Jul. 3, 2025

(51) Int. Cl.

| | |
|---|---|
| ***G05D 1/246*** | (2024.01) |
| ***G05D 1/622*** | (2024.01) |
| ***G06F 18/23*** | (2023.01) |
| ***G06T 7/579*** | (2017.01) |
| *G05D 111/10* | (2024.01) |

(52) U.S. Cl.

CPC ............. *G05D 1/246* (2024.01); *G05D 1/622* (2024.01); *G06F 18/23* (2023.01); *G06T 7/579* (2017.01); *G05D 2111/14* (2024.01); *G06T 2207/10024* (2013.01); *G06T 2207/10028* (2013.01); *G06T 2207/10048* (2013.01); *G06T 2207/30261* (2013.01)

(58) Field of Classification Search

CPC .... G05D 1/246; G05D 1/622; G05D 2111/14; G06T 7/579; G06T 2207/10024; G06T 2207/10028; G06T 2207/10048; G06T 2207/30261; G06F 18/23

USPC ........................................................... 701/25

See application file for complete search history.

(56) References Cited

U.S. PATENT DOCUMENTS

| | | | | |
|---|---|---|---|---|
| 2016/0274579 | A1* | 9/2016 | So | G05D 1/686 |
| 2020/0122344 | A1* | 4/2020 | Lee | B25J 9/1697 |
| 2021/0049376 | A1* | 2/2021 | Cui | G06V 10/255 |
| 2023/0168688 | A1* | 6/2023 | Song | G01C 21/20 701/25 |
| 2023/0210334 | A1* | 7/2023 | Huang | A47L 11/4011 15/319 |
| 2024/0111296 | A1* | 4/2024 | Kwon | G05D 1/622 |
| 2024/0362928 | A1* | 10/2024 | Abbott | G06T 11/20 |
| 2025/0322608 | A1* | 10/2025 | Oleynikova | G06T 17/05 |

* cited by examiner

*Primary Examiner* — Mahmoud S Ismail

(74) *Attorney, Agent, or Firm* — S.J. INTELLECTUAL PROPERTY LTD.

(57) ABSTRACT

Various aspects of techniques, systems, and use cases may be used for using a safety depth camera for controlling an autonomous mobile robot. An example technique may include receiving infrared data from at least two infrared receivers of a safety depth camera affixed to a robotic system, determining a safety status of the robotic system related to a detected object in an environment based on the infrared data, and sending an indication to at least one of emergency braking circuitry of the robotic system or adjustable braking circuitry of the robotic system based on the safety status.

13 Claims, 9 Drawing Sheets

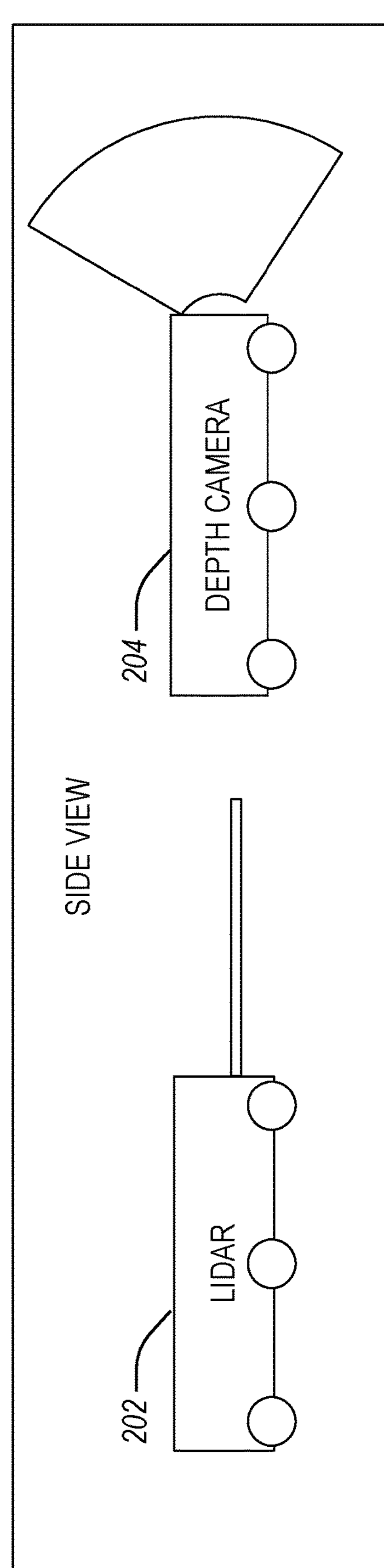
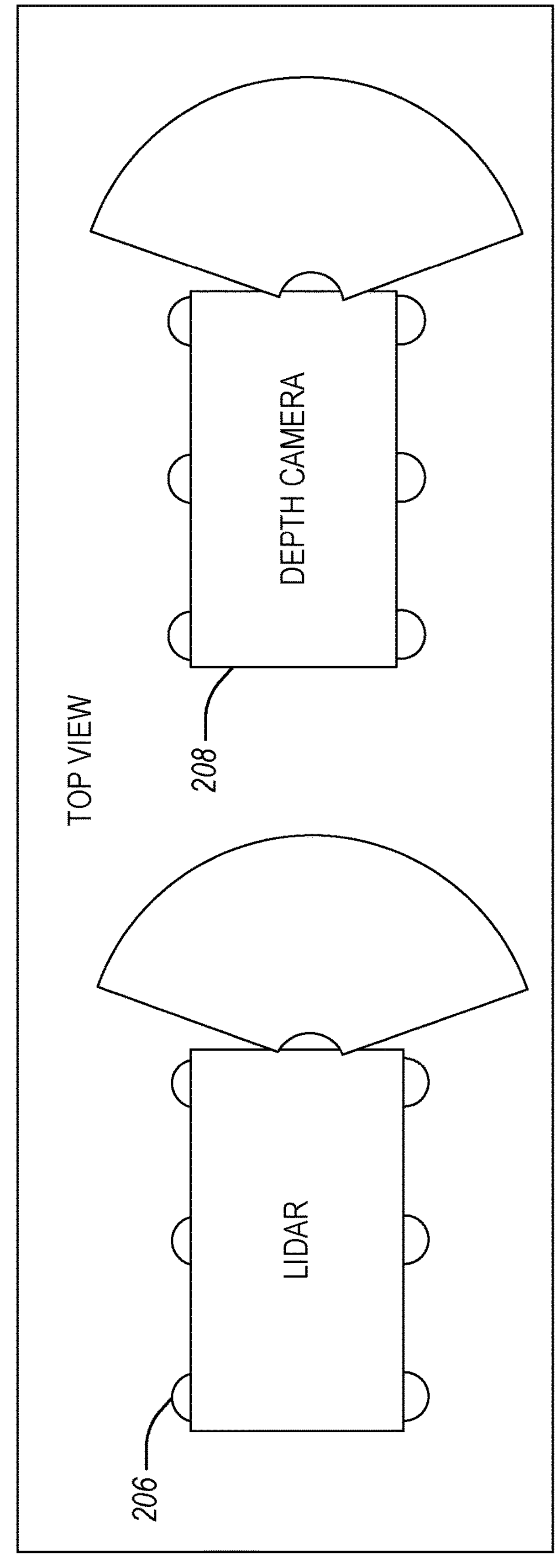
FIG. 2

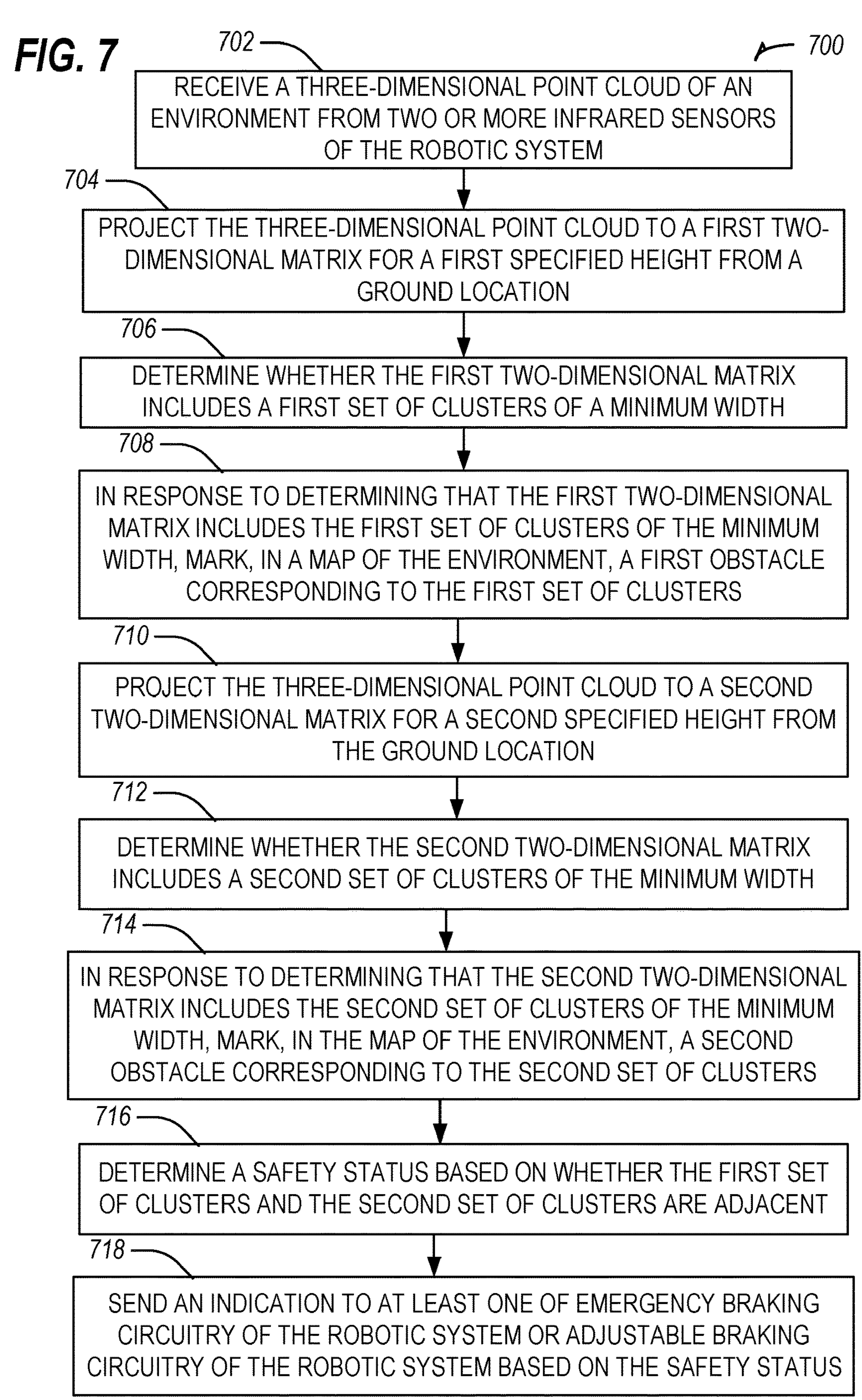
FIG. 7
700
702
RECEIVE A THREE-DIMENSIONAL POINT CLOUD OF AN ENVIRONMENT FROM TWO OR MORE INFRARED SENSORS OF THE ROBOTIC SYSTEM
704
PROJECT THE THREE-DIMENSIONAL POINT CLOUD TO A FIRST TWO-DIMENSIONAL MATRIX FOR A FIRST SPECIFIED HEIGHT FROM A GROUND LOCATION
706
DETERMINE WHETHER THE FIRST TWO-DIMENSIONAL MATRIX INCLUDES A FIRST SET OF CLUSTERS OF A MINIMUM WIDTH
708
IN RESPONSE TO DETERMINING THAT THE FIRST TWO-DIMENSIONAL MATRIX INCLUDES THE FIRST SET OF CLUSTERS OF THE MINIMUM WIDTH, MARK, IN A MAP OF THE ENVIRONMENT, A FIRST OBSTACLE CORRESPONDING TO THE FIRST SET OF CLUSTERS
710
PROJECT THE THREE-DIMENSIONAL POINT CLOUD TO A SECOND TWO-DIMENSIONAL MATRIX FOR A SECOND SPECIFIED HEIGHT FROM THE GROUND LOCATION
712
DETERMINE WHETHER THE SECOND TWO-DIMENSIONAL MATRIX INCLUDES A SECOND SET OF CLUSTERS OF THE MINIMUM WIDTH
714
IN RESPONSE TO DETERMINING THAT THE SECOND TWO-DIMENSIONAL MATRIX INCLUDES THE SECOND SET OF CLUSTERS OF THE MINIMUM WIDTH, MARK, IN THE MAP OF THE ENVIRONMENT, A SECOND OBSTACLE CORRESPONDING TO THE SECOND SET OF CLUSTERS
716
DETERMINE A SAFETY STATUS BASED ON WHETHER THE FIRST SET OF CLUSTERS AND THE SECOND SET OF CLUSTERS ARE ADJACENT
718
SEND AN INDICATION TO AT LEAST ONE OF EMERGENCY BRAKING CIRCUITRY OF THE ROBOTIC SYSTEM OR ADJUSTABLE BRAKING CIRCUITRY OF THE ROBOTIC SYSTEM BASED ON THE SAFETY STATUS

AUTONOMOUS MOBILE ROBOT WITH SAFETY DEPTH CAMERA

BACKGROUND

Robots and other autonomous agents may be programmed to complete complex real-world tasks. The field of robotics has developed to use artificial intelligence (AI) technologies to perform tasks in industrial environments, among many other environments. For instance, robotics span a wide range of industrial applications, such as smart manufacturing assembly lines, multi-robot automotive component assembly, computer and consumer electronics fabrication, smart retail and warehouse logistics, robotic datacenters, etc. Often robots interact with humans to complete tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates a comparative diagram showing light detection and ranging (LIDAR) versus infrared for object detection according to an example.

FIG. 7 illustrates a flowchart showing a technique for generating a depth image according to an example.

DETAILED DESCRIPTION

Systems and techniques described herein provide safety information (e.g., for a robotic system) and depth images using a depth camera, for example in a single housing. The safety information may include infrared data (e.g., an image) captured using the depth camera. The depth camera may include two or more infrared sensors, an infrared projector, and a camera (e.g., a color camera, such as an RGB camera, a black and white camera, etc.) in a single housing. The alignment of the infrared sensors, the infrared projector, and the camera may be static with respect to each other, for example prearranged. The prearrangement allows for processing images or data captured by the infrared sensors or the camera without needing to recalibrate, as may be necessary if the sensors or camera were in separate housing or devices. The infrared sensors may be used to capture depth data, which may be used for safety of a robotic device (e.g., object detection and emergency or regular braking), as well as for adding depth information to an image captured by the camera. The infrared data may be routed along two or more paths, for example to safety control circuitry for example to determine whether to cause the robotic system to brake, and to processing circuitry, for example to generate a depth image. The depth image may be used for location or mapping (e.g., orientation or location of the robotic system within a map of an environment).

In an example, one or several safety depth cameras (e.g., compliant with a standard such as an International Electrotechnical Commission (IEC) 61496-4-3 Safety of machinery—Electro-sensitive protective equipment—Part 4-3: Particular requirements for equipment using vision based protective devices (VBPD)—Additional requirements when using stereo vision techniques (VBPDST) standard or International Organization for Standardization (ISO) 3691-4) may be used with (e.g., incorporated into, affixed to, communicatively coupled, etc.) an autonomous mobile robot (AMR) for safety. A depth camera may be used for both vision and safety systems. Using the depth camera may allow the AMR to not use a LIDAR or other safety system. The depth camera provides a more efficient vision system than one that relies on LIDAR, which would also require a visible light camera.

One example technological benefit of using a depth camera over LIDAR is an improvement to a vertical range of detection of obstacles. For example, LIDAR is typically a planar solution and only capable of detecting a human ankle. A depth camera may be used to detect at multiple heights, and thus may detect an ankle, a foot, etc. The multiple heights may be captured with a single depth camera, whereas attempting to detect multiple heights with LIDAR may require multiple LIDAR systems, which is typically cost prohibitive.

Figure 1:
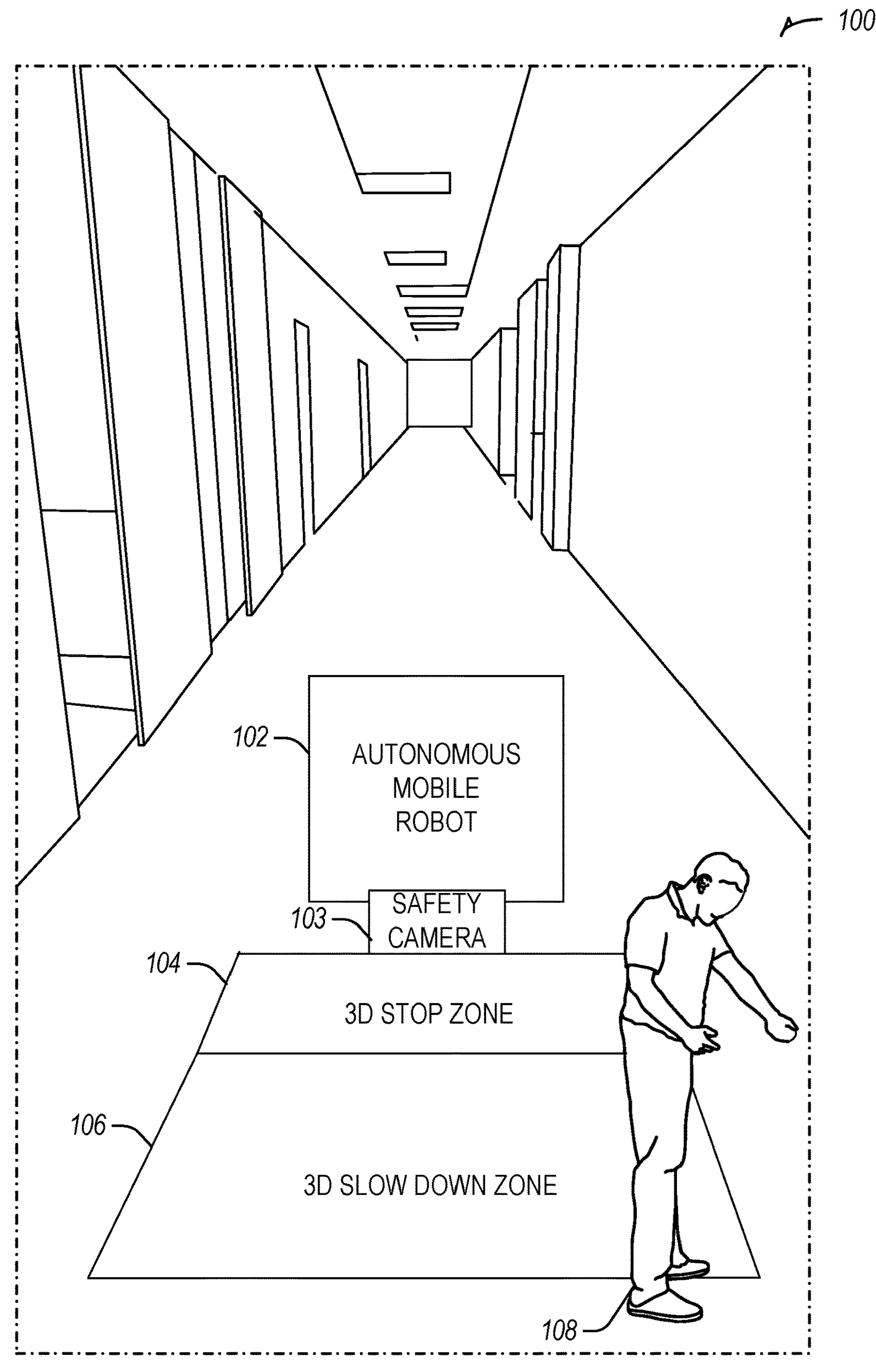
FIG. 1 illustrates an environment view including a robotic system, safety zones, and a person according to an example.

FIG. 1 illustrates an environment view 100 including a robotic system 102, safety zones 104 and 106, and a person 108 according to an example. The robotic system 102 may include an AMR with a depth camera 103, for example including two or more infrared sensors and a visible light camera in a single housing. The infrared sensors may scan the safety zones 104 and 106 to detect whether an obstacle, for example the person 108 has entered one of the zones. The safety zones may include a stop zone 104 and a slow down zone 106. The infrared sensors may capture infrared data indicative of an obstacle or clear of obstacles in the stop zone 104 or the slow down zone 106. The infrared data may be sent to safety circuitry to assess whether to apply an emergency brake in the robotic system 102, for example when an obstacle is detected in the stop zone 104, to slow down the robotic system 102, for example when an obstacle is detected in the slow down zone 106, or continue normal operations, for example when no obstacles are present in either safety zone 104.

In an example, the robotic system 102 may be an AMR operating in a warehouse or factory setting with humans. In some examples, robots that work on floors with humans are called cobots, for collaborative robot. The robotic system 102 may be self-navigating, for example configured to follow a path. The path may be preprogrammed or determined by the robotic system 102 or elsewhere, such as based on an objective, such as picking up an object in a first location and moving it to a second location. In some examples, the robotic system 102 may move only in a direction aligned with a field of vision of the depth camera 103. In other examples, multiple depth cameras may be used for different fields of vision (e.g., one front, one rear, and one on each side).

Infrared sensors of the robotic system 102 may be used to detect an object in three dimensions. For example, the infrared sensors may capture infrared data in 3D, for example at two or more heights. This may increase the confidence of object detection, avoid false positives, or the like. Data captured by the infrared sensors may be used with a visible light image captured by a camera of the robotic system 102, for example to create a depth image. In an example, the camera may be used for object identification. In some examples, camera captured data may be used for a visual Simultaneous Localization and Mapping (SLAM) technique. The SLAM technique may be used to map the environment in the environment view 100, while also determining a location of the robotic system 102 within the environment (e.g., within the map).

In an example, an image captured by the visible light camera may be used to navigate the robotic system 102. For example, an object of interest may be identified or a path may be determined based on the image, and optionally infrared data captured by the infrared sensors.

FIG. 2 illustrates a comparative diagram showing LIDAR and infrared object detection according to an example. The side views in FIG. 2 show a typical LIDAR side view 202 and an infrared (e.g., depth camera) side view 204 of vertical coverage for object detection according to the systems and techniques described herein. The side view 204 illustrates how the use of infrared provides for vertical coverage (e.g., 3D coverage) at different heights for object detection. In contrast, the LIDAR side view 202 only has a single planar object detection height coverage. The top views in FIG. 2 show a LIDAR top view 206 and an infrared top view 208. These two top views appear substantially similar coverage, meaning that the infrared coverage does not lose any side field of view compared to the LIDAR, but as seen in the side view 204, provides greatly improved height coverage.

Figure 3:
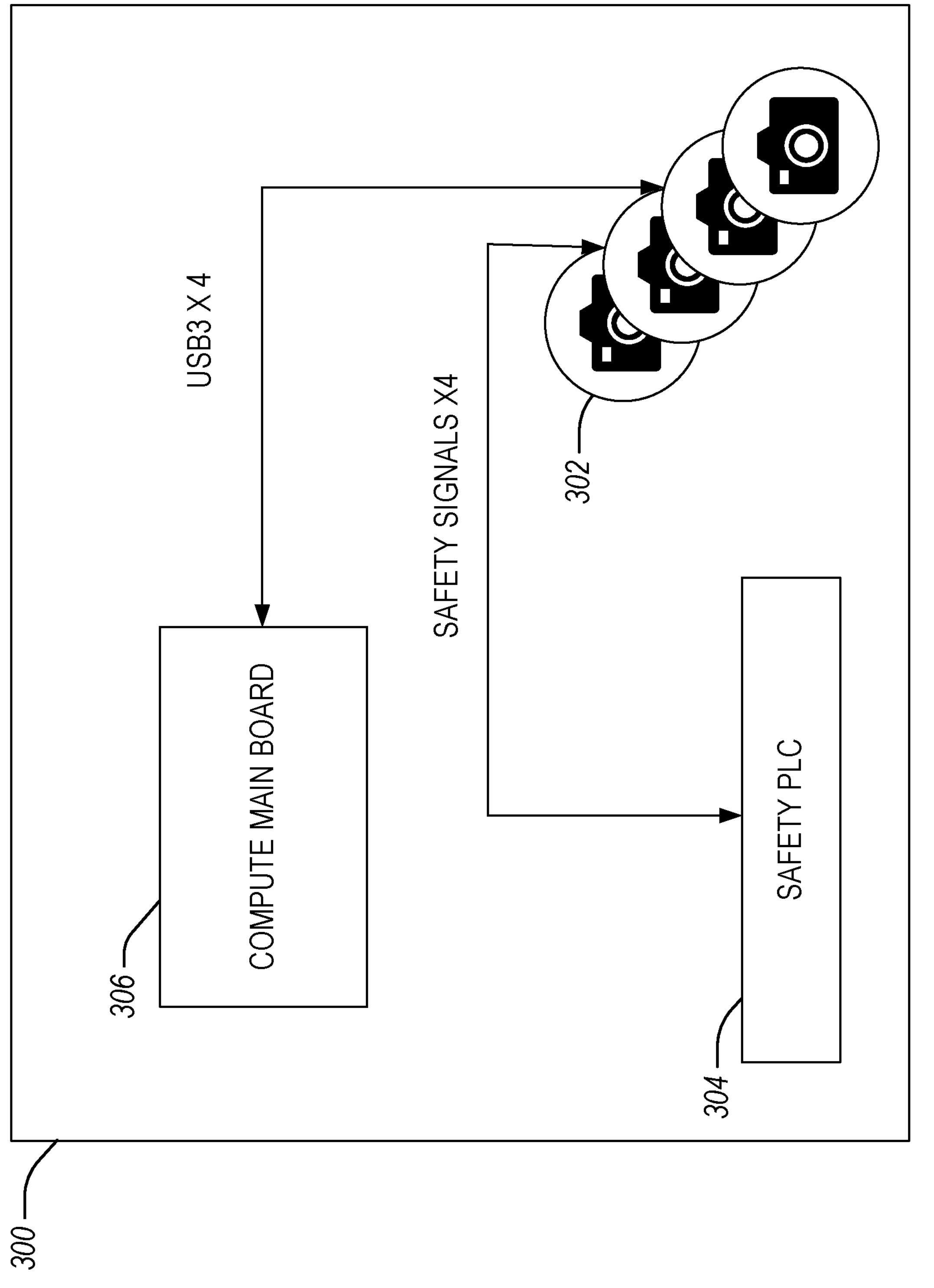
FIG. 3 illustrates a simplified data flow diagram including a camera sharing insights to both vision and safety systems according to an example.

FIG. 3 illustrates a simplified data flow diagram 300 according to an example. The data flow diagram illustrates a depth cameras 302 (in the example of FIG. 3, four depth cameras are shown for illustration). The depth cameras 302 may send captured data to a controller, such as a safety programmable logic controller (PLC) 304 and to a compute main board 306 (e.g., processing circuitry). The safety PLC 304 may determine whether braking needs to occur based on a detected object in a safety zone. The compute main board 306 may use data captured by the depth cameras 302 for typical robotic system purposes, such as SLAM, depth image generation, object identification, etc.

The depth cameras 302 may be connected to the safety PLC 304 with a particular dedicated safety hardware (e.g. EtherCat, output signal switching device (OSSD), or the like). In some examples, the depth cameras 302 may send data (e.g., raw data or 2fused data) to the compute main board 306 for non-safety algorithms or uses. The data may be transferred to the compute main board 306 via a wired connection (e.g. USB, ethernet, dedicated signal bus, etc.). The depth cameras 302 may include one or more presets to detect one or more AMR moving options.

Using data from the depth cameras 302 the AMR may perform one or more operations. For example, the AMR may monitor its own compute performance and software processes. The AMR may perform autonomous algorithms, navigate, gather and send telemetry, record video for streaming, obtain insights on an environment (e.g., a warehouse), gather 3D insights of the environment, use object or face detection, or the like.

Figure 4:
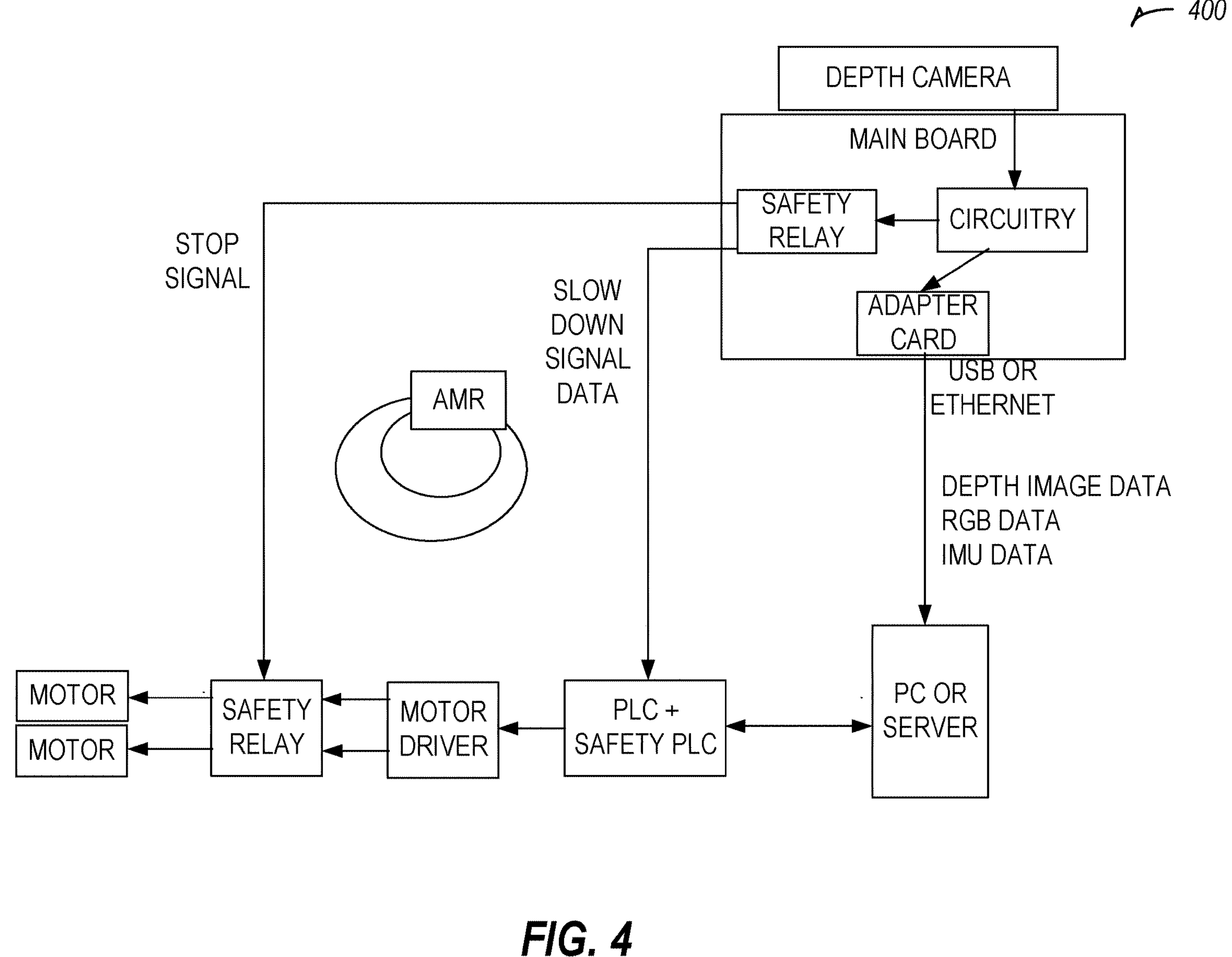
FIG. 4 illustrates a robotic system showing safety data flow according to an example.

FIG. 4 illustrates a robotic system 400 showing safety data flow according to an example. The robotic system 400 illustrates internal systems of an AMR that uses a depth camera for safety and image capture techniques. In the example shown in FIG. 4, a depth camera captures infrared and visible light data (e.g., using an infrared sensor and a color camera). The infrared data is processed by safety control circuitry, and where appropriate, sent to an emergency braking system or to a safety PLC system, which may slow the AMR. The safety control circuitry determines whether an object is present within a stop zone or a slow down zone, in accordance with some examples. The visible light data may be sent, optionally along with the infrared data, to processing circuitry to be used for SLAM, navigation, collision avoidance (e.g., outside of safety zones), trajectory planning, path planning, or the like.

In an example, the infrared sensors may capture a 3D point cloud (e.g., reflected from the environment based on a pattern projected by an infrared projector, where the infrared projector, the infrared sensors, and the visible light camera may all be housed in a single unit). According to an example standard, a minimum detection of a leg may include a dimension of at least 70 millimeters (mm). The 3D point cloud may be projected with a height of 15 to 30 centimeters (cm) to a 2D matrix, in some examples. Each cell may be filtered against a threshold, for example to reduce noise. After thresholding, clusters with a dimension of at least 70 mm may be selected (e.g., to be considered as identifying a human). This process may be iterated, for example with a different range of height, for example to detect whether a foot is present, where the previous height identified whether an ankle was present. When a foot cluster is identified that is close to a leg or ankle cluster, the clusters may be fused and treated as being identified as a human.

In an example, detecting a human foot may occur sooner than a leg or ankle, giving us more time to use other types of safety brake, like SS1 (Safety stop 1), instead of STO (e.g., full power braking). In these examples, the deceleration is smoother and reduces the risk of losing cargo carried by the AMR.

When several cameras on an AMR are used, some or all of them may have overlapping field of views. For each overlapping area, a comparison of the clusters found above may be used. In some examples, the distance from a particular camera to a cluster may be weighted. When a cluster is farther from a camera (e.g., 2-3 meters), the cluster may be enlarged, since in stereoscopic cameras, the noise level is greater according to the distance. A comparison may be performed by checking the field of view and center of mass of each cluster. When a cluster is only found in one camera in the region that a second camera should detect, an emergency message may be sent to perform an emergency stop, since there is a high probability that there is a problem with one of the cameras.

Figure 5:
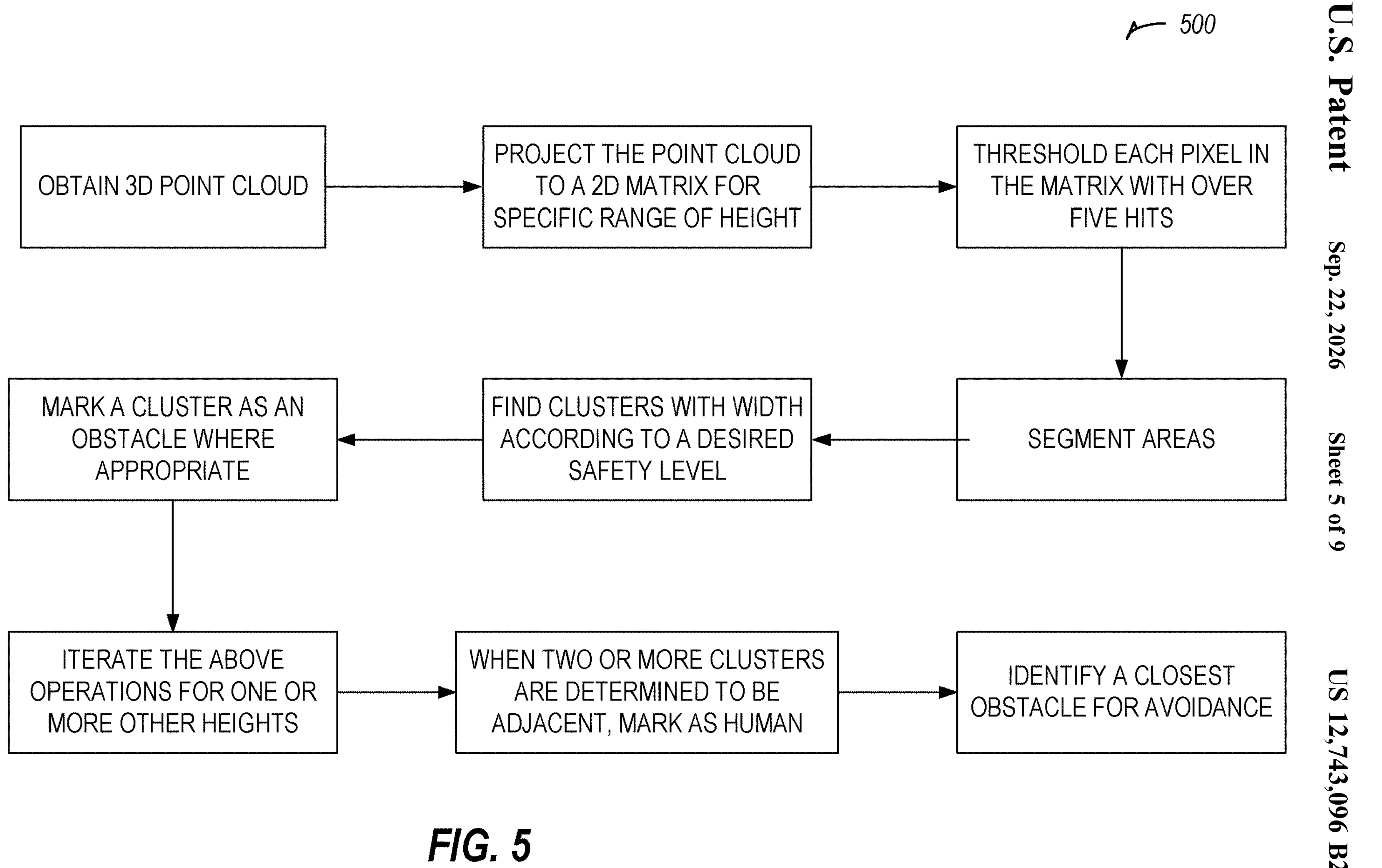
FIG. 5 illustrates a block diagram for safety detection according to an example.

FIG. 5 illustrates a block diagram 500 for safety detection according to an example. The block diagram 500 includes blocks that describe a technique for safely detecting a human leg or foot, according to an example. The block diagram 500 includes a block to obtain a 3D point cloud. The 3D point cloud may be projected to a 2D matrix, such as for a specific height or range of heights (e.g., within a few mm). Each pixel in the 2D matrix with over a threshold number of hits (e.g., five hits) may be thresholded. Segmentation may occur for the matrix after thresholding. Clusters may be identified in the segmented matrix, for example with a minimum width according to a safety criteria (e.g., a minimum of 50 mm, 70 mm, 100 mm, etc.) When a cluster is identified as failing the safety criteria (e.g., being larger than the minimum), the cluster may be marked as an obstacle. One or more iterations may occur, such as to detect whether a cluster exists at another height value or range. when two or more clusters are identified as obstacles at two or more heights, they may be marked as a human. In some examples, a closest obstacle (e.g., human, cluster, etc.) may be selected as a first priority for avoidance, such as for emergency braking or slowing down.

Figure 6:
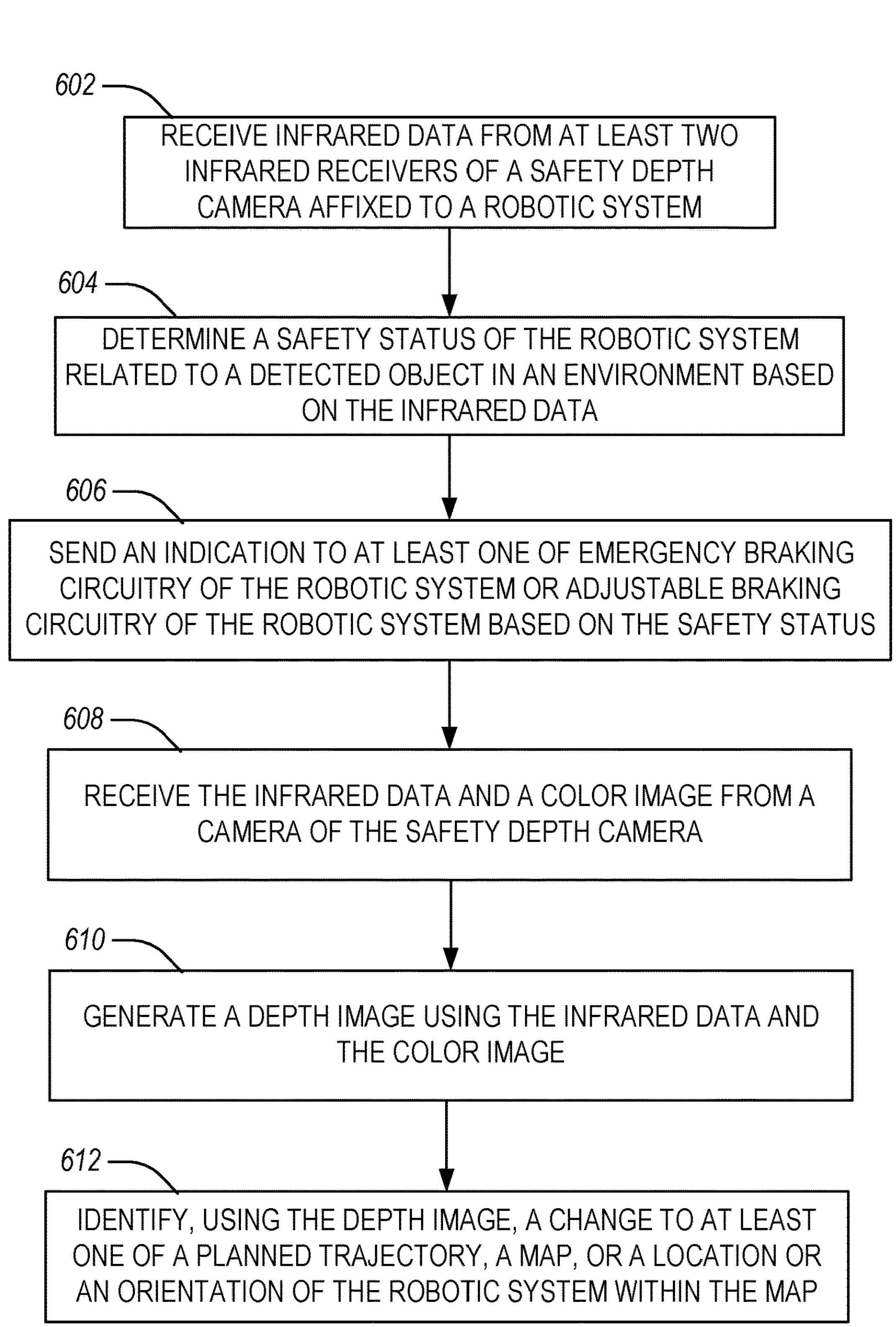
FIG. 6 illustrates a flowchart showing a technique for determining a safety status of a robotic system according to an example.

FIG. 6 illustrates a flowchart showing a technique 600 for FIG. 6 illustrates a flowchart showing a technique for determining a safety status of a robotic system according to an example. The technique 600 may be performed by a computing device (e.g., including processing circuitry), by a robotic device (e.g., including processing circuitry), etc.

The technique 600 includes an operation 602 to receive infrared data from at least two infrared receivers of a safety depth camera affixed to a robotic system. The at least two infrared receivers may be housed in a single housing of a safety depth camera. In an example, the single housing may also include an infrared projector.

The technique 600 includes an operation 604 to determine a safety status of the robotic system related to a detected object in an environment based on the infrared data. The detected object may include a portion of a human, such as a leg, an ankle, or a foot. In an example, the infrared data may include a three-dimensional point cloud. In this example, operation 604 may include projecting the three-dimensional point cloud to a first two-dimensional matrix for a first specified height from a ground location, determining whether the first two-dimensional matrix includes a first set of clusters of a minimum width, and in response marking, in the map of an environment, the detected object corresponding to the first set of clusters. This example may be iterated at a second height. A determination may be made as to whether the first set of clusters and an iterated second set of clusters are adjacent (e.g., within a minimum distance). Operation 604 may include determining a closest identifiable obstacle.

The technique 600 includes an operation 606 to send an indication to at least one of emergency braking circuitry of the robotic system or adjustable braking circuitry of the robotic system based on the safety status. Operation 606 may include, when the safety status indicates that the detected object is within a first threshold, sending the indication to the emergency braking circuitry, and when the detected object is outside the first threshold and within a second threshold, sending the indication to the adjustable braking circuitry.

The technique 600 includes an operation 608 to receive the infrared data and a color image from a camera of the safety depth camera. The technique 600 includes an operation 610 to generate a depth image using the infrared data and the color image.

The technique 600 includes an operation 612 to identify, using the depth image, a change to at least one of a planned trajectory, a map, or a location or an orientation of the robotic system within the map. Operation 612 may include using a visual Simultaneous Localization and Mapping (SLAM) algorithm to identify the change to the location and the orientation of the robotic system within the map.

FIG. 7 illustrates a flowchart showing a technique 700 for FIG. 7 illustrates a flowchart showing a technique for generating a depth image according to an example. The technique 700 may be performed by a computing device (e.g., including processing circuitry), by a robotic device (e.g., including processing circuitry), etc.

The technique 700 includes an operation 702 to receive a three-dimensional point cloud of an environment from two or more infrared sensors of the robotic system.

The technique 700 includes an operation 704 to project the three-dimensional point cloud to a first two-dimensional matrix for a first specified height from a ground location.

The technique 700 includes an operation 706 to determine whether the first two-dimensional matrix includes a first set of clusters of a minimum width. In an example, operation 706 includes thresholding each pixel in the first two-dimensional matrix with over a minimum number of points. In this example, operation 706 may include segmenting the first two-dimensional matrix after the thresholding.

The technique 700 includes an operation 708 to mark, in a map of the environment, a first obstacle corresponding to the first set of clusters, in response to determining that the first two-dimensional matrix includes the first set of clusters of the minimum width.

The technique 700 includes an operation 710 to project the three-dimensional point cloud to a second two-dimensional matrix for a second specified height from the ground location. In an example, the second specified height is closer to the ground location than the first specified height.

The technique 700 includes an operation 712 to determine whether the second two-dimensional matrix includes a second set of clusters of the minimum width.

The technique 700 includes an operation 714 to mark, in the map of the environment, a second obstacle corresponding to the second set of clusters, in response to determining that the second two-dimensional matrix includes the second set of clusters of the minimum width.

The technique 700 includes an operation 716 to determine a safety status based on whether the first set of clusters and the second set of clusters are adjacent. Operation 716 may include determining a closest identified obstacle.

The technique 700 includes an operation 718 to send an indication to at least one of emergency braking circuitry of the robotic system or adjustable braking circuitry of the robotic system based on the safety status. In an example, when the safety status indicates that the first obstacle is within a first threshold, the indication is sent to the emergency braking circuitry, and when the first obstacle is outside the first threshold and within a second threshold, the indication is sent to the adjustable braking circuitry.

The technique 700 may include using a safety depth camera, the safety depth camera including the two or more infrared sensors, an infrared projector, and an image capture sensor. The technique 700 may include generating a depth image from the three-dimensional point cloud and a color image captured by the image capture sensor and identifying, using the depth image, a change to at least one of a planned trajectory, a map, a location or orientation of the robotic system within the map, or the like.

In further examples, any of the compute nodes or devices discussed with reference to the present computing systems (e.g., robotic devices) and environment may be fulfilled based on the components depicted in FIGS. 8A and 8B. Respective compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., a robotic system, or other device or system capable of performing the described functions.

Figure 8A:
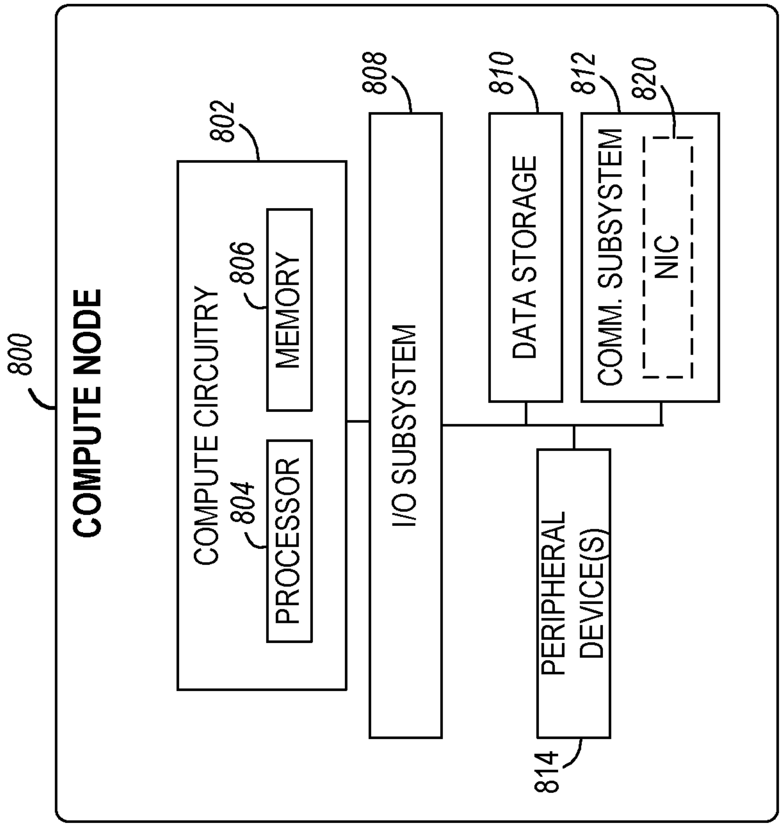
FIG. 8A provides an overview of example components for compute deployed at a compute node.

In the simplified example depicted in FIG. 8A, an edge compute node 800 includes a compute engine (also referred to herein as "compute circuitry") 802, an input/output (I/O) subsystem 808, data storage 810, a communication circuitry subsystem 812, and, optionally, one or more peripheral devices 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or other processor or processing/controlling circuit.

In some examples, the processor 804 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 or the main memory 806) and other components of the compute circuitry 802. For example, the I/O subsystem 808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

The one or more illustrative data storage devices 810 may be embodied as any type of devices configured for short-term or long-term storage of data such as, for example, memory devices and circuits, memory cards, hard disk drives, solid-state drives, or other data storage devices. Individual data storage devices 810 may include a system partition that stores data and firmware code for the data storage device 810. Individual data storage devices 810 may also include one or more operating system partitions that store data files and executables for operating systems depending on, for example, the type of compute node 800.

The communication circuitry 812 may be embodied as any communication circuit, device, or collection thereof, capable of enabling communications over a network between the compute circuitry 802 and another compute device (e.g., a gateway of an implementing computing system). The communication circuitry 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., a gateway node). In some examples, the NIC 820 may be embodied as part of a system-on-a-chip (SoC) that includes one or more processors, or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or alternatively, in such examples, the local memory of the NIC 820 may be integrated into one or more components of the client compute node at the board level, socket level, chip level, or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective compute node (whether a client, gateway, or aggregation node) in a computing system or like forms of appliances, computers, subsystems, circuitry, or other components.

Figure 8B:
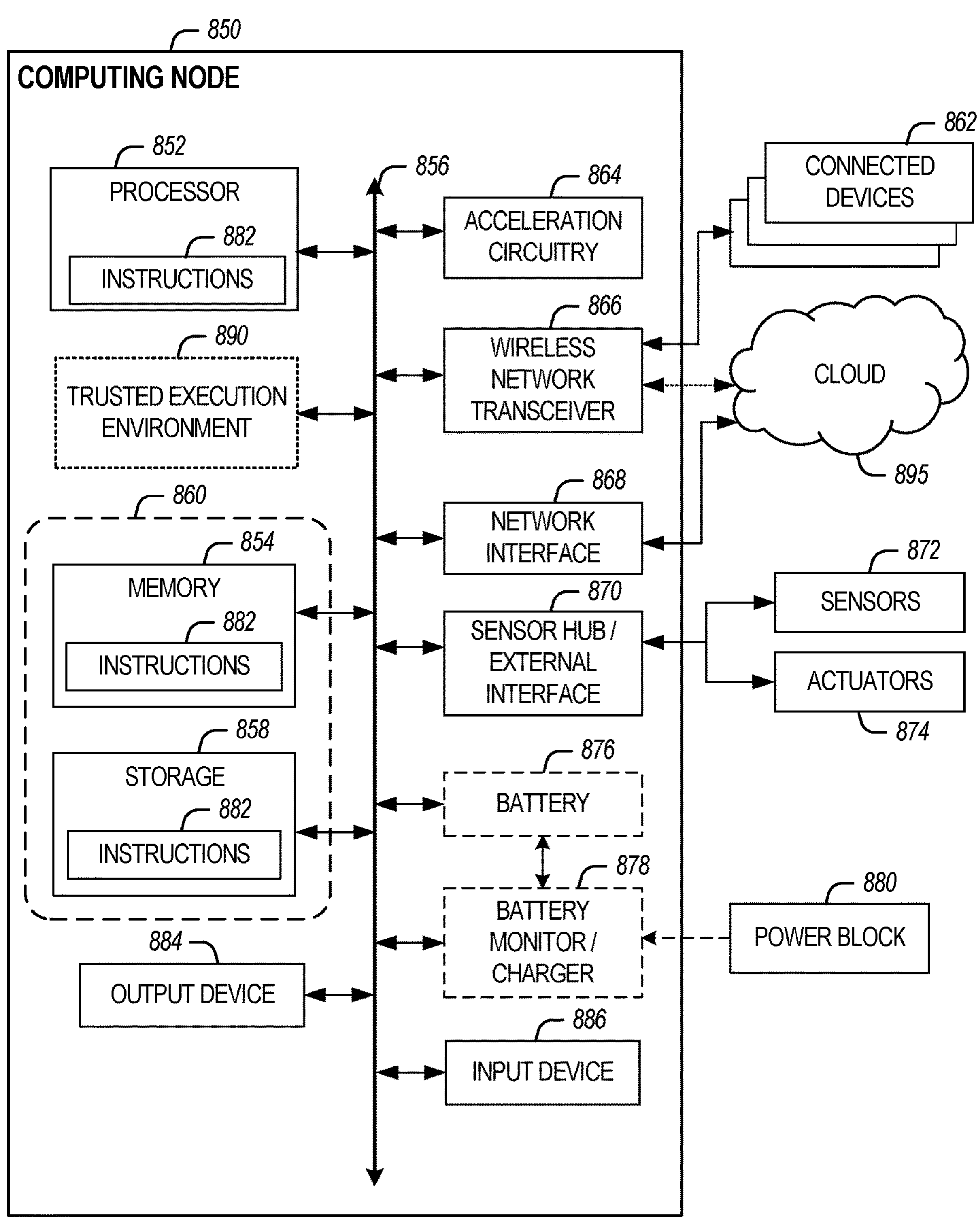
FIG. 8B provides a further overview of example components within a computing device.

In a more detailed example, FIG. 8B illustrates a block diagram of an example of components that may be present in a computing node 850 for implementing the techniques (e.g., operations, processes, methods, and methodologies) described herein. This computing node 850 provides a closer view of the respective components of node 800 when implemented as or as part of a computing device (e.g., as a mobile device, a base station, server, gateway, etc.). The computing node 850 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 850, or as components otherwise incorporated within a chassis of a larger system.

The computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8B.

The processor 852 may communicate with a system memory 854 over an interconnect 856 (e.g., a bus). Any number of memory devices may be used to provide for a given amount of system memory. As examples, the memory 854 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected devices 862. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the computing node 850 may communicate with close devices, e.g., within about 10 meters, using a local transceiver based on Bluetooth Low Energy (BLE), or another low power radio, to save power. More distant connected devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the cloud 895 via local or wide area network protocols. The wireless network transceiver 866 may be a low-power wide-area (LPWA) transceiver that follows the IEEE 802.15.4, or IEEE 802.15.4g standards, among others. The computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the cloud 895 or to other devices, such as the connected devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the computing node 850 to actuators 874, such as power switches, valve actuators, an audible sound generator, a visual warning device, and the like.

In some optional examples, various input/output (I/O) devices may be present within or connected to, the computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 850. A display or console hardware, in the context of the present system, may be used to provide output and receive input of a computing system; to manage components or services of a computing system; identify a state of a computing component or service; or to conduct any other number of management or administration functions or service use cases.

A battery 876 may power the computing node 850, although, in examples in which the computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is a device comprising: safety control circuitry to: receive infrared data from at least two infrared receivers of a safety depth camera affixed to a robotic system; determine a safety status of the robotic system related to a detected object in an environment based on the infrared data; and send an indication to at least one of emergency braking circuitry of the robotic system or adjustable braking circuitry of the robotic system based on the safety status; and processing circuitry to: receive the infrared data and a color image from a camera of the safety depth camera; generate a depth image using the infrared data and the color image; and identify, using the depth image, a change to at least one of a planned trajectory, a map, or a location or an orientation of the robotic system within the map.

In Example 2, the subject matter of Example 1 includes, wherein when the safety status indicates that the detected object is within a first threshold, the indication is sent to the emergency braking circuitry, and when the detected object is outside the first threshold and within a second threshold, the indication is sent to the adjustable braking circuitry.

In Example 3, the subject matter of Examples 1-2 includes, wherein the detected object is a portion of a human.

In Example 4, the subject matter of Examples 1-3 includes, wherein to identify, using the depth image, the change includes using a visual Simultaneous Localization and Mapping (SLAM) algorithm to identify the change to the location and the orientation of the robotic system within the map.

Example 5 is a robotic system comprising: a safety depth camera comprising: an infrared projector; at least two infrared receivers; and an image capture sensor; emergency braking circuitry; adjustable braking circuitry; safety control circuitry to: receive infrared data from the at least two infrared receivers; determine a safety status related to a detected object based on the infrared data; and send an indication to at least one of the emergency braking circuitry or the adjustable braking circuitry based on the safety status; and processing circuitry to: receive the infrared data and a color image from the image capture sensor; generate a depth image using the infrared data and the color image; and identify, using the depth image, a change to at least one of a planned trajectory, a map, or a location or an orientation of the robotic system within the map.

In Example 6, the subject matter of Example 5 includes, wherein the infrared projector, the at least two infrared receivers, and the image capture sensor are within a single housing of the safety depth camera.

In Example 7, the subject matter of Examples 5-6 includes, wherein the infrared data includes a three-dimensional point cloud, and wherein to determine the safety status includes operations to: project the three-dimensional point cloud to a first two-dimensional matrix for a first specified height from a ground location; determine whether the first two-dimensional matrix includes a first set of clusters of a minimum width; and in response to determining that the first two-dimensional matrix includes the first set of clusters of the minimum width, marking, in the map of an environment, the detected object corresponding to the first set of clusters.

In Example 8, the subject matter of Example 7 includes, wherein to determine the safety status includes operations to: project the three-dimensional point cloud to a second two-dimensional matrix for a second specified height from the ground location; determine whether the second two-dimensional matrix includes a second set of clusters of the minimum width; and in response to determining that the second two-dimensional matrix includes the second set of clusters of the minimum width, mark, in the map of the environment, a second detected object corresponding to the second set of clusters.

In Example 9, the subject matter of Example 8 includes, wherein to determine the safety status includes to determine the safety status based on whether the first set of clusters and the second set of clusters are adjacent.

In Example 10, the subject matter of Examples 5-9 includes, wherein when the safety status indicates that the detected object is within a first threshold, the indication is sent to the emergency braking circuitry, and when the detected object is outside the first threshold and within a second threshold, the indication is sent to the adjustable braking circuitry.

In Example 11, the subject matter of Examples 5-10 includes, wherein the detected object is a portion of a human.

In Example 12, the subject matter of Examples 5-11 includes, wherein to identify, using the depth image, the change includes using a visual Simultaneous Localization and Mapping (SLAM) algorithm to identify the change to the location and the orientation of the robotic system within the map.

In Example 13, the subject matter of Examples 5-12 includes, wherein to determine the safety status includes to determine a closest identified obstacle.

Example 14 is at least one machine-readable medium including instructions, which when executed by safety processing circuitry of a robotic system, cause the safety processing circuitry to perform operations including: receiving a three-dimensional point cloud of an environment from two or more infrared sensors of the robotic system; projecting the three-dimensional point cloud to a first two-dimensional matrix for a first specified height from a ground location; determining whether the first two-dimensional matrix includes, a first set of clusters of a minimum width; in response to determining that the first two-dimensional matrix includes the first set of clusters of the minimum width, marking, in a map of the environment, a first obstacle corresponding to the first set of clusters; projecting the three-dimensional point cloud to a second two-dimensional matrix for a second specified height from the ground location; determining whether the second two-dimensional matrix includes a second set of clusters of the minimum width; in response to determining that the second two-dimensional matrix includes the second set of clusters of the minimum width, marking, in the map of the environment, a second obstacle corresponding to the second set of clusters; determining a safety status based on whether the first set of clusters and the second set of clusters are adjacent; and sending an indication to at least one of emergency braking circuitry of the robotic system or adjustable braking circuitry of the robotic system based on the safety status.

In Example 15, the subject matter of Example 14 includes, wherein determining whether the first two-dimensional matrix includes the first set of clusters of the minimum width includes thresholding each pixel in the first two-dimensional matrix with over a minimum number of points.

In Example 16, the subject matter of Example 15 includes, wherein determining whether the first two-dimensional matrix includes the first set of clusters of the minimum width includes segmenting the first two-dimensional matrix after the thresholding.

In Example 17, the subject matter of Examples 14-16 includes, wherein the second specified height is closer to the ground location than the first specified height.

In Example 18, the subject matter of Examples 14-17 includes, wherein determining the safety status includes determining a closest identified obstacle.

In Example 19, the subject matter of Examples 14-18 includes, wherein when the safety status indicates that the first obstacle is within a first threshold, the indication is sent to the emergency braking circuitry, and when the first obstacle is outside the first threshold and within a second threshold, the indication is sent to the adjustable braking circuitry.

In Example 20, the subject matter of Examples 14-19 includes, wherein the two or more infrared sensors of the robotic system are part of a safety depth camera, the safety depth camera including an image capture sensor, and further comprising operations including: generating a depth image from the three-dimensional point cloud and a color image captured by the image capture sensor; and identifying, using the depth image, a change to at least one of a planned trajectory, a map, or a location or an orientation of the robotic system within the map.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks), memory cards or sticks, random access memories (RAMs), read only memories (ROMs), and the like.

What is claimed is:

1. A device comprising:

safety control circuitry to:

receive infrared data from at least two infrared receivers of a safety depth camera affixed to a robotic system;

determine a safety status of the robotic system related to a detected object in an environment based on the infrared data; and send an indication to at least one of emergency braking circuitry of the robotic system or adjustable braking circuitry of the robotic system based on the safety status; and processing circuitry to:

receive the infrared data and a color image from a camera of the safety depth camera;

generate a depth image using the infrared data and the color image; and identify, using the depth image, a change to at least one of a planned trajectory, a map, or a location or an orientation of the robotic system within the map.

2. The device of claim 1, wherein when the safety status indicates that the detected object is within a first threshold, the indication is sent to the emergency braking circuitry, and when the detected object is outside the first threshold and within a second threshold, the indication is sent to the adjustable braking circuitry.

3. The device of claim 1, wherein the detected object is a portion of a human.

4. The device of claim 1, wherein to identify, using the depth image, the change includes using a visual Simultaneous Localization and Mapping (SLAM) algorithm to identify the change to the location and the orientation of the robotic system within the map.

5. A robotic system comprising:

a safety depth camera comprising:

an infrared projector;

at least two infrared receivers; and an image capture sensor;

emergency braking circuitry;

adjustable braking circuitry;

safety control circuitry to:

receive infrared data from the at least two infrared receivers;

determine a safety status related to a detected object based on the infrared data; and send an indication to at least one of the emergency braking circuitry or the adjustable braking circuitry based on the safety status; and processing circuitry to:

receive the infrared data and a color image from the image capture sensor;

generate a depth image using the infrared data and the color image; and identify, using the depth image, a change to at least one of a planned trajectory, a map, or a location or an orientation of the robotic system within the map.

6. The robotic system of claim 5, wherein the infrared projector, the at least two infrared receivers, and the image capture sensor are within a single housing of the safety depth camera.

7. The robotic system of claim 5, wherein the infrared data includes a three-dimensional point cloud, and wherein to determine the safety status includes operations to:

project the three-dimensional point cloud to a first two-dimensional matrix for a first specified height from a ground location;

determine whether the first two-dimensional matrix includes a first set of clusters of a minimum width; and in response to determining that the first two-dimensional matrix includes the first set of clusters of the minimum width, mark, in the map of an environment, the detected object corresponding to the first set of clusters.

8. The robotic system of claim 7, wherein to determine the safety status includes operations to:

project the three-dimensional point cloud to a second two-dimensional matrix for a second specified height from the ground location;

determine whether the second two-dimensional matrix includes a second set of clusters of the minimum width; and in response to determining that the second two-dimensional matrix includes the second set of clusters of the minimum width, mark, in the map of the environment, a second detected object corresponding to the second set of clusters.

9. The robotic system of claim 8, wherein to determine the safety status includes to determine the safety status based on whether the first set of clusters and the second set of clusters are adjacent.

10. The robotic system of claim 5, wherein when the safety status indicates that the detected object is within a first threshold, the indication is sent to the emergency braking circuitry, and when the detected object is outside the first threshold and within a second threshold, the indication is sent to the adjustable braking circuitry.

11. The robotic system of claim 5, wherein the detected object is a portion of a human.

12. The robotic system of claim 5, wherein to identify, using the depth image, the change includes using a visual Simultaneous Localization and Mapping (SLAM) algorithm to identify the change to the location and the orientation of the robotic system within the map.

13. The robotic system of claim 5, wherein to determine the safety status includes to determine a closest identified obstacle.

* * * * *